(12) United States Patent
Dillon

(10) Patent No.: US 11,913,536 B2
(45) Date of Patent: Feb. 27, 2024

(54) SYSTEM, METHOD AND APPARATUS FOR PROVIDING A GEARBOX EXPANSION CAP AND VALVE ASSEMBLY

(71) Applicant: Valmont Industries, Inc., Omaha, NE (US)

(72) Inventor: Cory J. Dillon, Bennington, NE (US)

(73) Assignee: Valmont Industries, Inc., Omaha, NE (US)

( * ) Notice: Subject to any disclaimer, the term of this patent is extended or adjusted under 35 U.S.C. 154(b) by 0 days.

(21) Appl. No.: 17/863,604

(22) Filed: Jul. 13, 2022

(65) Prior Publication Data

US 2023/0038931 A1    Feb. 9, 2023

Related U.S. Application Data

(60) Provisional application No. 63/230,197, filed on Aug. 6, 2021.

(51) Int. Cl.

| F16H 57/02 | (2012.01) |
| F16K 17/02 | (2006.01) |
| F16K 17/18 | (2006.01) |
| F16H 57/027 | (2012.01) |
| F16K 17/04 | (2006.01) |
| F16H 57/029 | (2012.01) |
| A01G 25/09 | (2006.01) |

(52) U.S. Cl.
CPC ....... *F16H 57/027* (2013.01); *F16K 17/0406* (2013.01); *F16K 17/18* (2013.01); *A01G 25/092* (2013.01); *F16H 57/029* (2013.01); *F16K 17/0413* (2013.01)

(58) Field of Classification Search
CPC ...... F16H 57/027; F16H 57/029; F16K 17/04; F16K 17/0406; F16K 17/0413; F16K 17/18; F16K 17/196; F16K 17/30
See application file for complete search history.

(56) References Cited

U.S. PATENT DOCUMENTS

| 1,639,670 | A | * | 8/1927 | Rydner | ................... | F16K 24/04 |
| | | | | | | 55/516 |
| 3,253,684 | A | * | 5/1966 | Maurice | ................... | F16H 45/00 |
| | | | | | | 192/3.3 |

(Continued)

FOREIGN PATENT DOCUMENTS

| AT | | 524612 A1 | * | 7/2022 | | |
| JP | | 2018035824 A | * | 3/2018 | | |
| WO | WO-2005098291 A1 | | * | 10/2005 | ........... | F16H 57/027 |

OTHER PUBLICATIONS

International Application PCT/US202022/036967, International Search Report and Written Opinion dated Dec. 16, 2022, 10 pages.

*Primary Examiner* — Adam D Rogers
(74) *Attorney, Agent, or Firm* — Milligan PC LLO

(57) ABSTRACT

The present invention teaches a gearbox expansion cap that allows a gearbox unit to breathe to atmosphere while preventing the ingress of water or other materials into the gearbox or gearbox oil. According to a first preferred embodiment, the expansion cap of the present invention includes a pressure relief plug to control gearbox pressures. Additionally, the present invention teaches air channels enclosed within a gearbox casting which mate with air channels provided within the expansion cap to channel air from the expansion cap into the atmosphere.

15 Claims, 11 Drawing Sheets

(56) References Cited

U.S. PATENT DOCUMENTS

| | | | | |
|---|---|---|---|---|
| 5,062,447 | A * | 11/1991 | Davison, Jr. | F16H 57/027 |
| | | | | 137/493 |
| 5,129,422 | A * | 7/1992 | Davison, Jr. | F16H 57/027 |
| | | | | 33/727 |
| 6,843,747 | B1 * | 1/2005 | Phanco | F16H 57/0447 |
| | | | | 74/606 R |
| 8,826,774 | B1 * | 9/2014 | Craig | F16H 57/027 |
| | | | | 74/606 R |
| 10,415,688 | B2 * | 9/2019 | Dillon | F16K 24/04 |
| 10,948,068 | B2 * | 3/2021 | Tesner | B01D 45/06 |
| 2010/0032242 | A1 * | 2/2010 | Lin | F01M 13/00 |
| | | | | 184/6.12 |
| 2017/0335923 | A1 | 11/2017 | Smith et al. | |
| 2023/0116887 | A1 * | 4/2023 | Maier | B60K 11/06 |
| | | | | 180/68.1 |

\* cited by examiner

SYSTEM, METHOD AND APPARATUS FOR PROVIDING A GEARBOX EXPANSION CAP AND VALVE ASSEMBLY

RELATED APPLICATIONS

The present application claims priority to U.S. Provisional Application No. 63/230,197 filed Aug. 6, 2021.

BACKGROUND AND FIELD OF THE PRESENT INVENTION

Field of the Present Invention

The present invention relates to an apparatus and method for venting and controlling pressures within a gearbox.

Background of the Invention

Modern field irrigation machines are combinations of drive systems and sprinkler systems. In operation, self-propelled towers of irrigation machines are driven by drive motors attached to the wheels of each tower. To allow for the translation of torque from the drive motors to the wheels, drive motors generally include gearboxes such as worm gearboxes. The worm gearbox used in irrigation systems is typically a closed system, meaning it cannot freely vent to atmosphere due to the wet and dirty environment. In the prior art, worm gearboxes have used diaphragms to prevent contamination ingress, and to control internal pressure/vacuum of the gearbox. This is effective in many applications, but with the diaphragm in place, there is always some degree of pressure/vacuum present in the gearbox. This creates unwanted stress on the gearbox and gearbox components (i.e., seals, gears, etc.) and the constant pressure is known to diminish the potential life of the gearbox.

Other prior art solutions have included adding breathers directly into the fill port of the wheel gearbox. These solutions have been found to cause oil leaks due to gearbox oil expansion as well as allow contamination of the gearbox interior during movement of the irrigation tower. Other example solutions are shown in U.S. Publication No. US20080156374A1 which discloses a breather device which includes a valve mechanism for blocking the end of a breather path when water pressure of water flowing toward the breather path acts on the valve mechanism. Similarly, WO2011058571A1 discloses an air breather vent assembly for a mechanically enclosed environment which includes a single or double ball valve housed inside a central exhaust and intake chamber of body to allow for suction and exhaust of air. Further, U.S. Pat. No. 8,944,091 discloses a system for ventilation and aeration of a gear housing containing an oil filling and which has a line for connecting the gear housing to the atmosphere. U.S. Pat. No. 8,826,774 and U.S. Publication No. US20080156374A1 likewise show methods to relieve pressure within a gearbox.

For each of the prior art systems, oil leaks, contamination ingress and air flow stoppages are consistent occurrences. In order to overcome the limitations of the prior art, a system is needed which is able to effectively provide venting to the atmosphere while also limiting contamination within a gearbox during transport and irrigation operations.

Summary of the Disclosure

To minimize the limitations found in the prior art, and to minimize other limitations that will be apparent upon the reading of the specifications, the present invention teaches a gearbox expansion cap that allows a gearbox unit to breathe to atmosphere while preventing the ingress of water or other materials into the gearbox or gearbox oil. According to a first preferred embodiment, the present invention includes air channels enclosed within a gearbox casting and which mate with air channels provided within the expansion cap.

According to a second preferred embodiment, the present invention teaches an expansion cap which includes a pressure relief plug to control gearbox pressures.

According to a further preferred embodiment, the present invention includes an expansion cap assembly which includes a gravity plug which includes a ball which adjustably prevents oil from leaving the expansion cap when the gearbox is unlevel.

According to a further preferred embodiment, the present invention teaches an alternative expansion cap assembly which includes a hinged plate with a sealing portion which prevents oil from leaving the gearbox during shipping.

DESCRIPTION OF THE PREFERRED EMBODIMENTS

Figure 1:
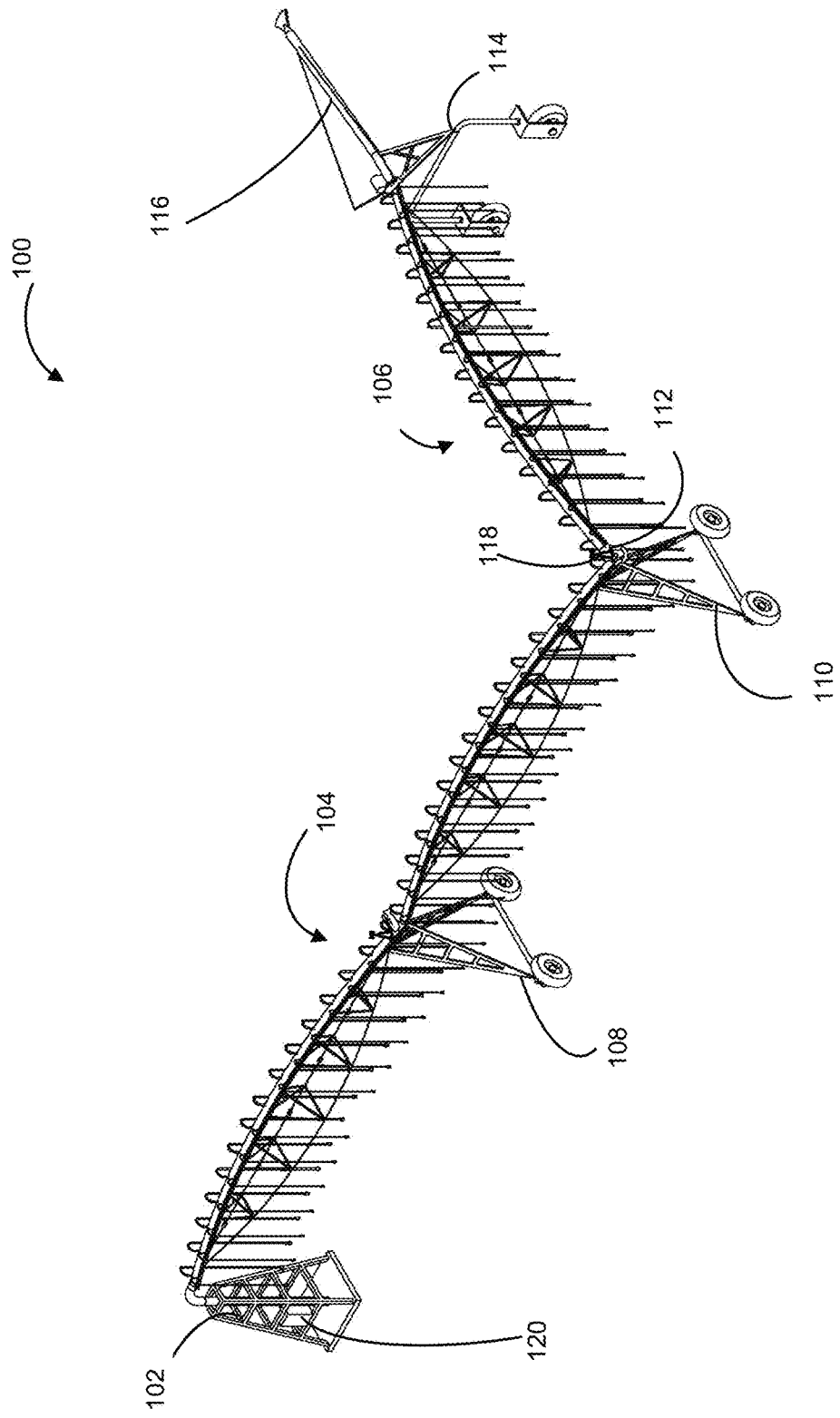
FIG. 1 shows an illustration of an exemplary irrigation machine in accordance with a first preferred embodiment of the present invention.

The present invention provides a system, method and apparatus for venting and controlling pressures within a gearbox. For the purposes of promoting an understanding of the principles of the present invention, reference will now be made to the embodiments illustrated in the drawings and specific language will be used to describe the same. It will nevertheless be understood that no limitation of the scope of the present invention is hereby intended and such alterations and further modifications in the illustrated devices are contemplated as would normally occur to one skilled in the art. The descriptions, embodiments and figures used are not to be taken as limiting the scope of the claims.

Where the specification describes advantages of an embodiment or limitations of other prior art, the applicant does not intend to disclaim or disavow any potential embodiments covered by the appended claims unless the applicant specifically states that it is "hereby disclaiming or disavowing" potential claim scope. Moreover, the terms "embodiments of the invention", "embodiments" or "invention" do not require that all embodiments of the invention include the discussed feature, advantage or mode of operation, nor that it does not incorporate aspects of the prior art which are sub-optimal or disadvantageous.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Additionally, any examples or illustrations given herein are not to be regarded in any way as restrictions on, limits to, or express definitions of, any term or terms with which they are utilized. Instead, these examples or illustrations are to be regarded as illustrative only.

As used herein, the singular forms "a", "an" and "the" are intended to include the plural forms as well, unless the context clearly indicates otherwise. Additionally, the word "may" is used in a permissive sense (i.e., meaning "having the potential to'), rather than the mandatory sense (i.e., meaning "must"). Further, it should also be understood that throughout this disclosure, unless logically required to be otherwise, where a process or method is shown or described, the steps of the method may be performed in any order (i.e., repetitively, iteratively, or simultaneously) and selected steps may be omitted. It will be further understood that the terms "comprises," "comprising," "includes" and/or "including", when used herein, specify the presence of stated features, integers, steps, operations, elements, and/or components, but do not preclude the presence or addition of one or more other features, integers, steps, operations, elements, components, and/or groups thereof.

With reference now to FIG. 1, an exemplary irrigation machine 100 of the present invention may for example include a center pivot structure 102, a main span 104, and supporting drive towers 108, 110. The exemplary irrigation machine 100 may also include a corner span 106 attached at a connection point 112. The corner span 106 may be supported and moved by a steerable drive unit 114. The corner span 106 may include a boom 116 and an end gun (not shown) and/or other sprayers. Additionally, a position sensor 118 may provide positional and angular orientation data for the system. A central control panel 120 may also be provided and may enclose on-board computer systems for monitoring and controlling the operations of the irrigation machine. The control panel 120 may also be linked to a transceiver for transmitting and receiving data between system elements, device/internet clouds, remote servers and the like.

Figure 2:
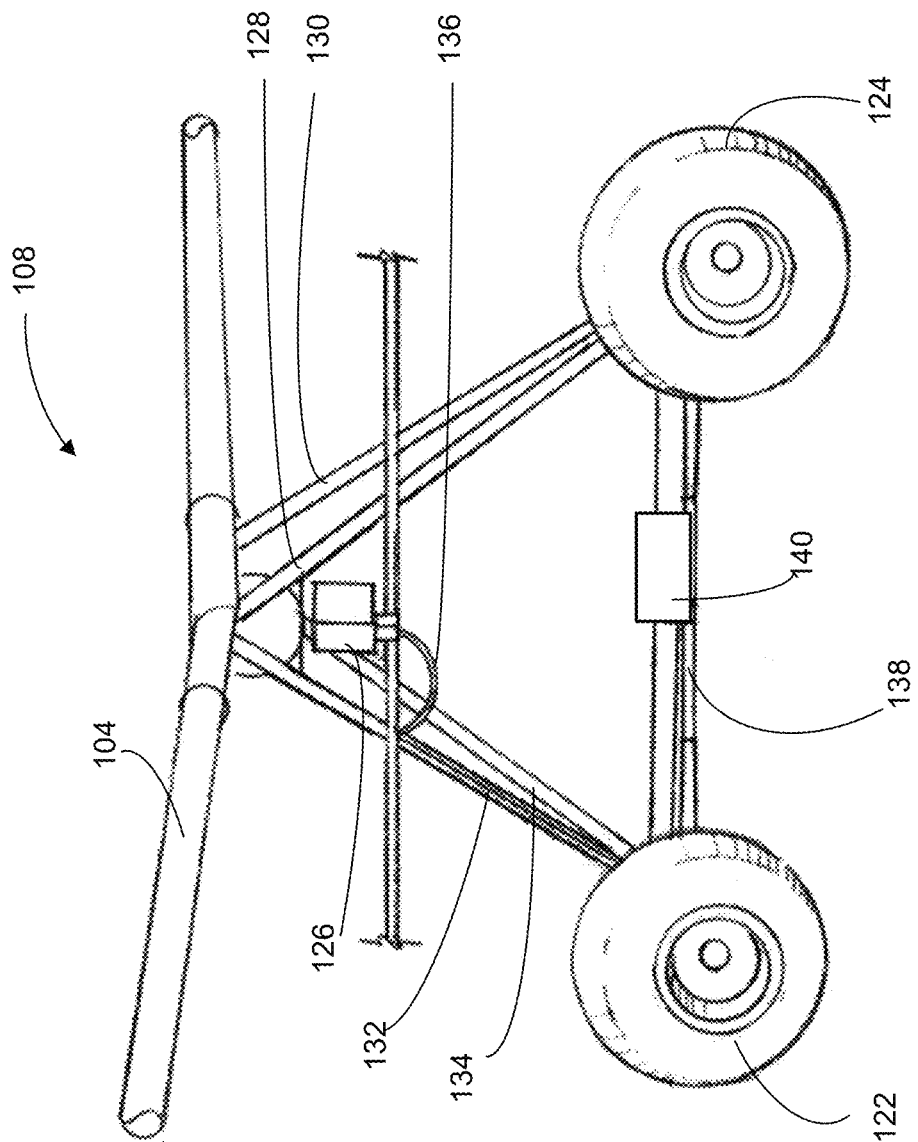
FIG. 2 shows a perspective view of an exemplary drive tower in accordance with a first preferred embodiment of the present invention.

With reference now to FIG. 2, an exemplary drive tower 108 supporting a span 104 is shown in more detail. As shown, the frame of the drive tower 108 includes supporting legs 128, 130, 132, 134 which transfer the weight of the supported span 104 onto one or more wheels 122, 124. According to a preferred embodiment, one or more of the supporting wheels 122, 124 are preferably drive wheels which are driven by one or more drive motors 140. According to preferred embodiments, the one or more drive motors 140 used by the present invention may for example be variable speed motors or the like. For example, an exemplary motor used with the present invention may include: a switched reluctance motor (SRM), an AC induction motor with a variable frequency drive, a DC motor (such as a permanent magnet DC motor) or other motor types without limitation.

Referring again to FIG. 2, the drive tower 108 preferably includes a drive motor controller 126 which may receive control instructions from the tower control panel 120 or from another source. The drive motor controller 126 may preferably provide electrical power to the drive motor 140 via one or more electrical control lines/wires 136. In operation, the electrical power provided through the drive motor controller 126 may be transformed by the drive motor 140 into torque/rotational motion applied to a drive shaft 138.

Figure 3:
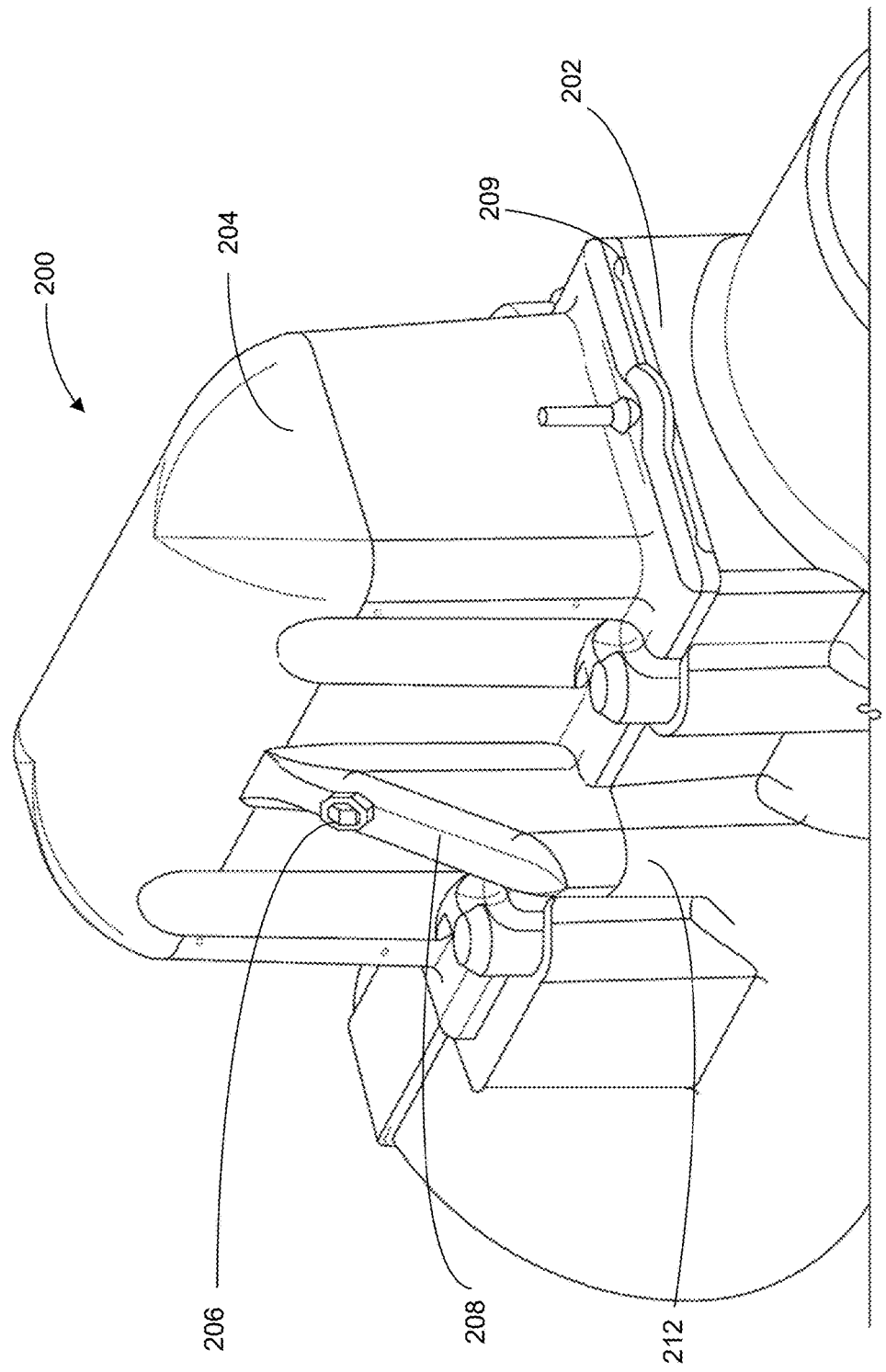
FIG. 3 shows a perspective view of an exemplary gearbox and gearbox valve assembly in accordance with the present invention.
Figure 4:
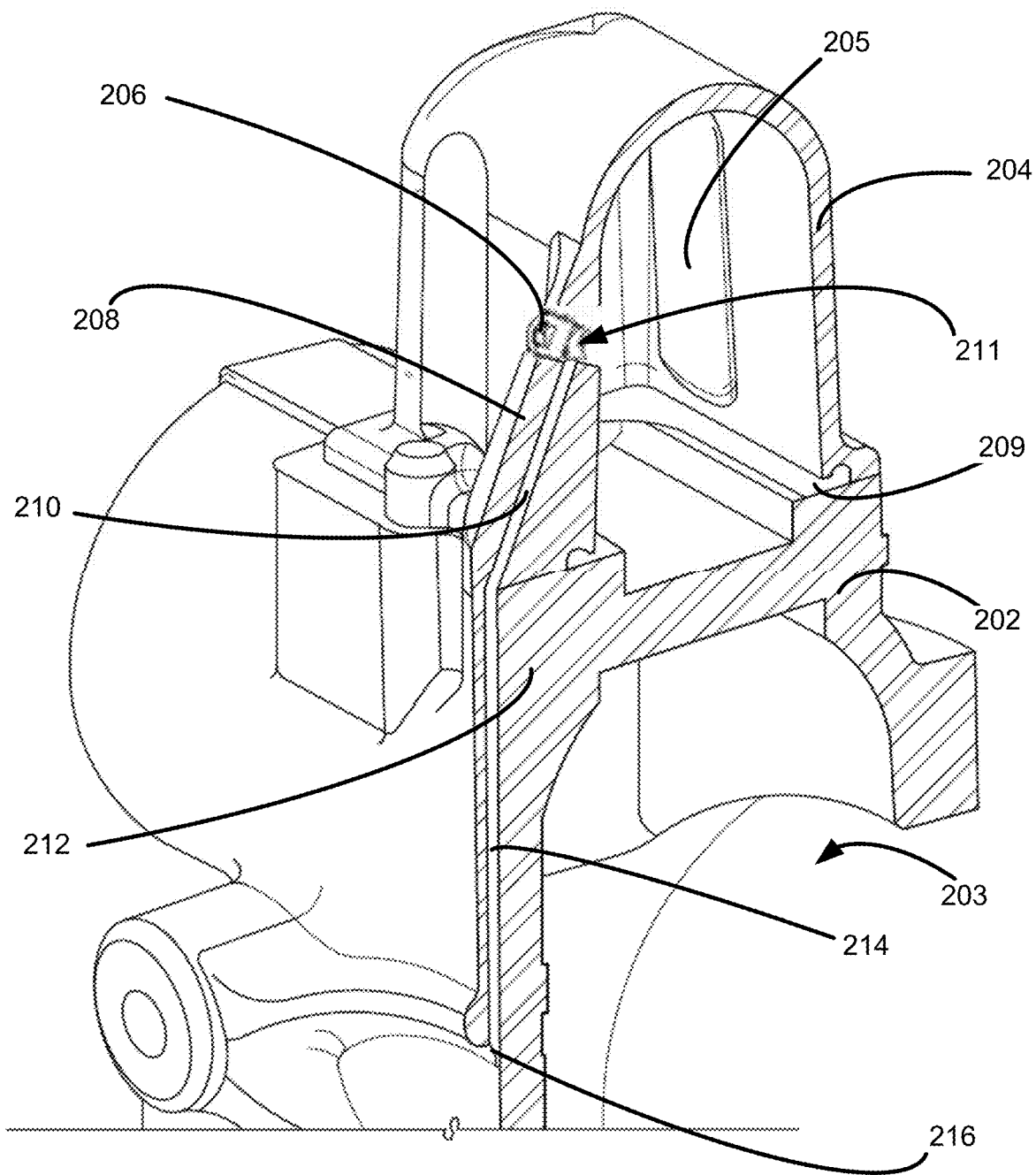
FIG. 4 shows a perspective cut-away view of the exemplary gearbox and gearbox valve assembly shown in FIG. 3.

With reference now to FIGS. 3-11, aspects of exemplary gearbox assemblies for translating torque provided by a drive motor to one or more drive wheels shall now be discussed. Referring first to FIGS. 3-4, perspective views of an exemplary gearbox assembly 200 is provided. As shown, the exemplary gearbox assembly 200 of the present invention preferably may include an expansion cap 204 which is secured to the top of an exemplary gearbox 202. As shown, the expansion cap 204 may be bolted or otherwise secured to the exemplary gearbox 202 and may include a seal/gasket 209 between the expansion cap 204 and gearbox 202.

As shown, the expansion cap 204 may be formed as a domed enclosure which encloses a volume of air within a central cavity 205. According to a preferred embodiment, the expansion cap 204 preferably may include an expansion cap vent enclosure 208. Additionally, the gearbox 202 may be formed with a gearbox casting vent enclosure 212. Preferably, the expansion cap vent enclosure 208 and the gearbox casting vent enclosure 212 are formed to connect/mate so that they may enclose one or more connected internal air passages as discussed further below. As shown, the expansion cap vent enclosure 208 may preferably include a vent cap plug 206 or other sealing assemblies as discussed below.

Figure 5:
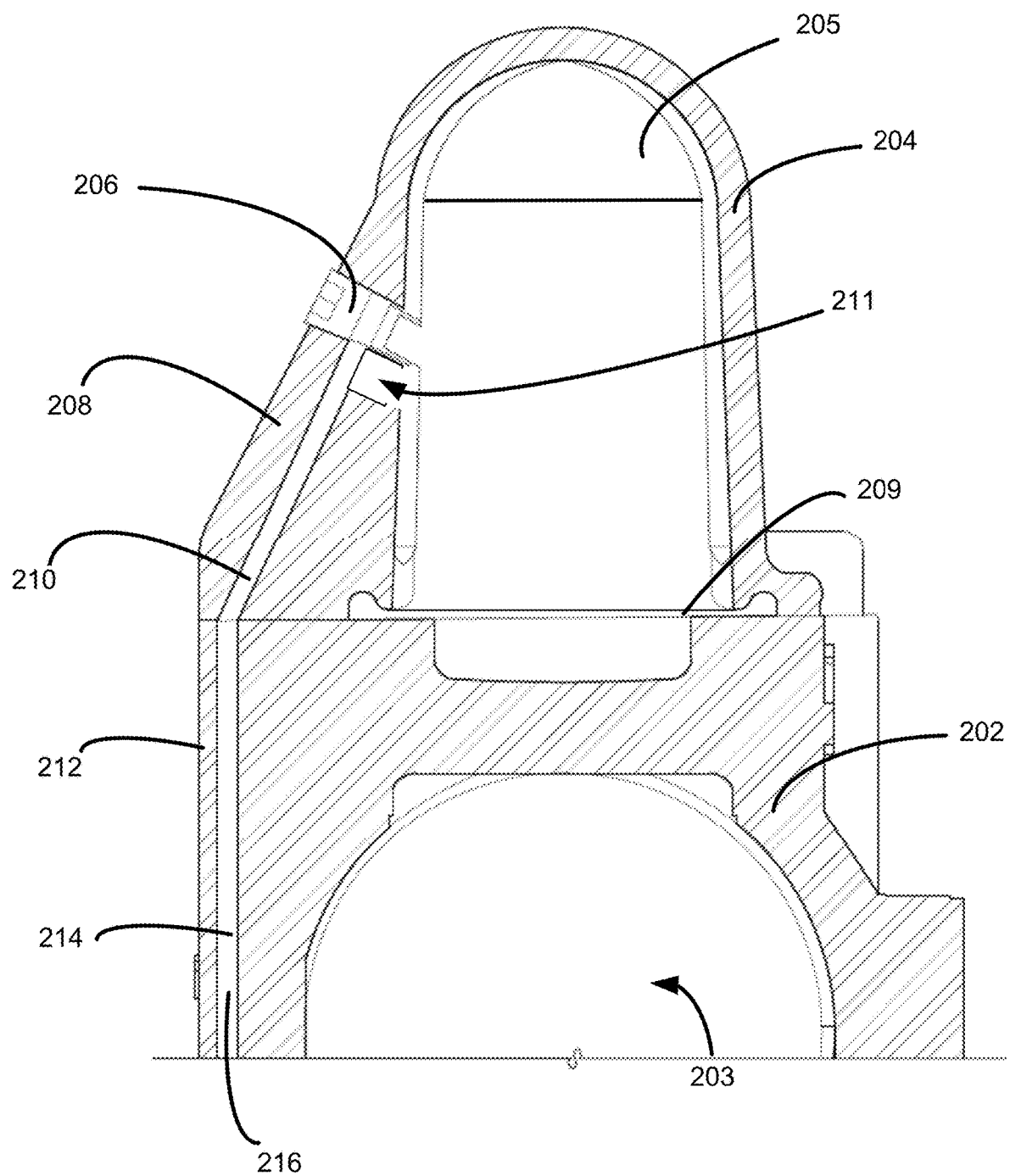
FIG. 5 shows a side, cut-away view of the first exemplary gearbox valve assembly shown in FIG. 3.
Figure 6:
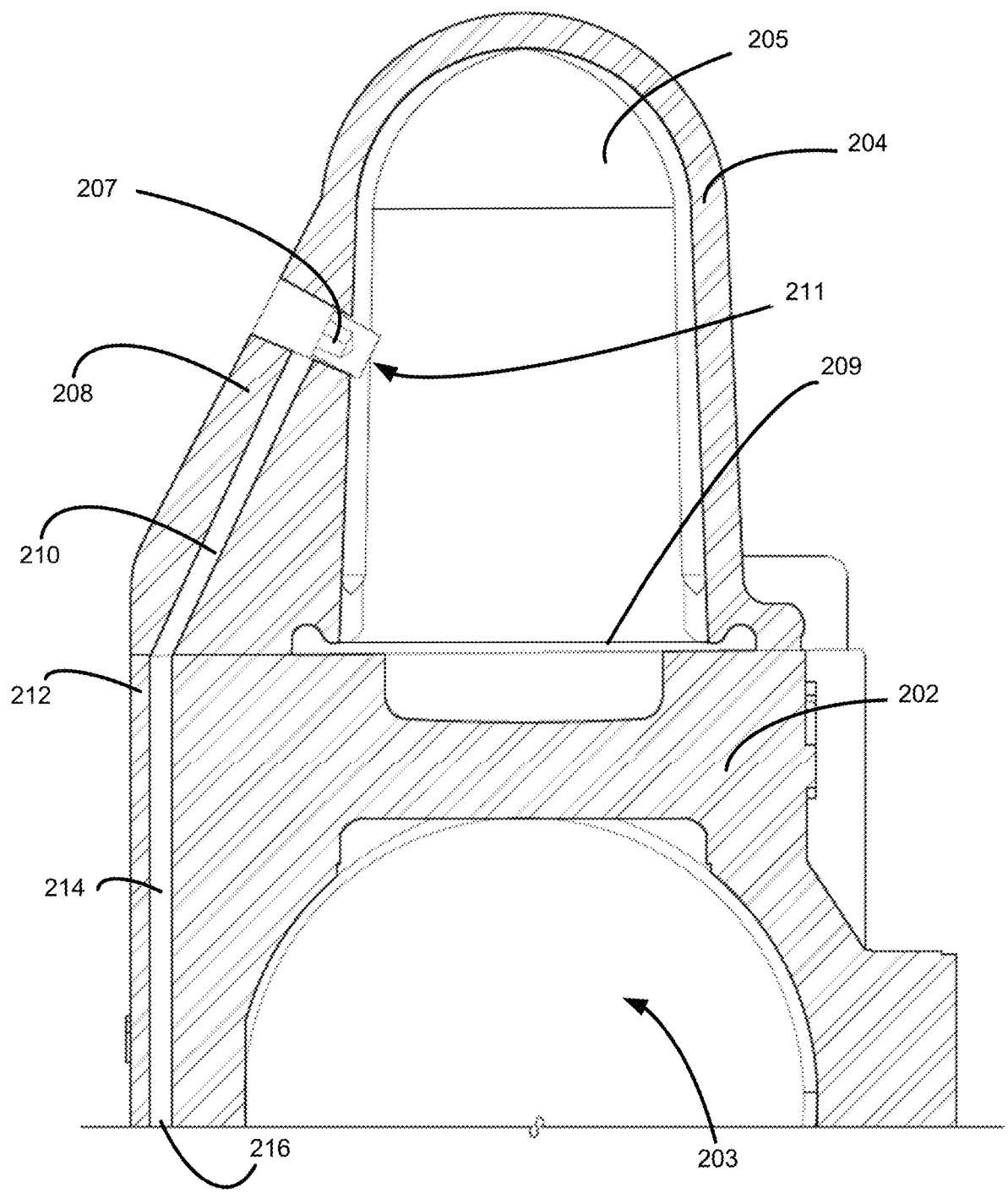
FIG. 6 shows a side, cut-away view of an exemplary pressure relief assembly as shown in FIG. 5 with an alternative vent plug.
Figure 7:
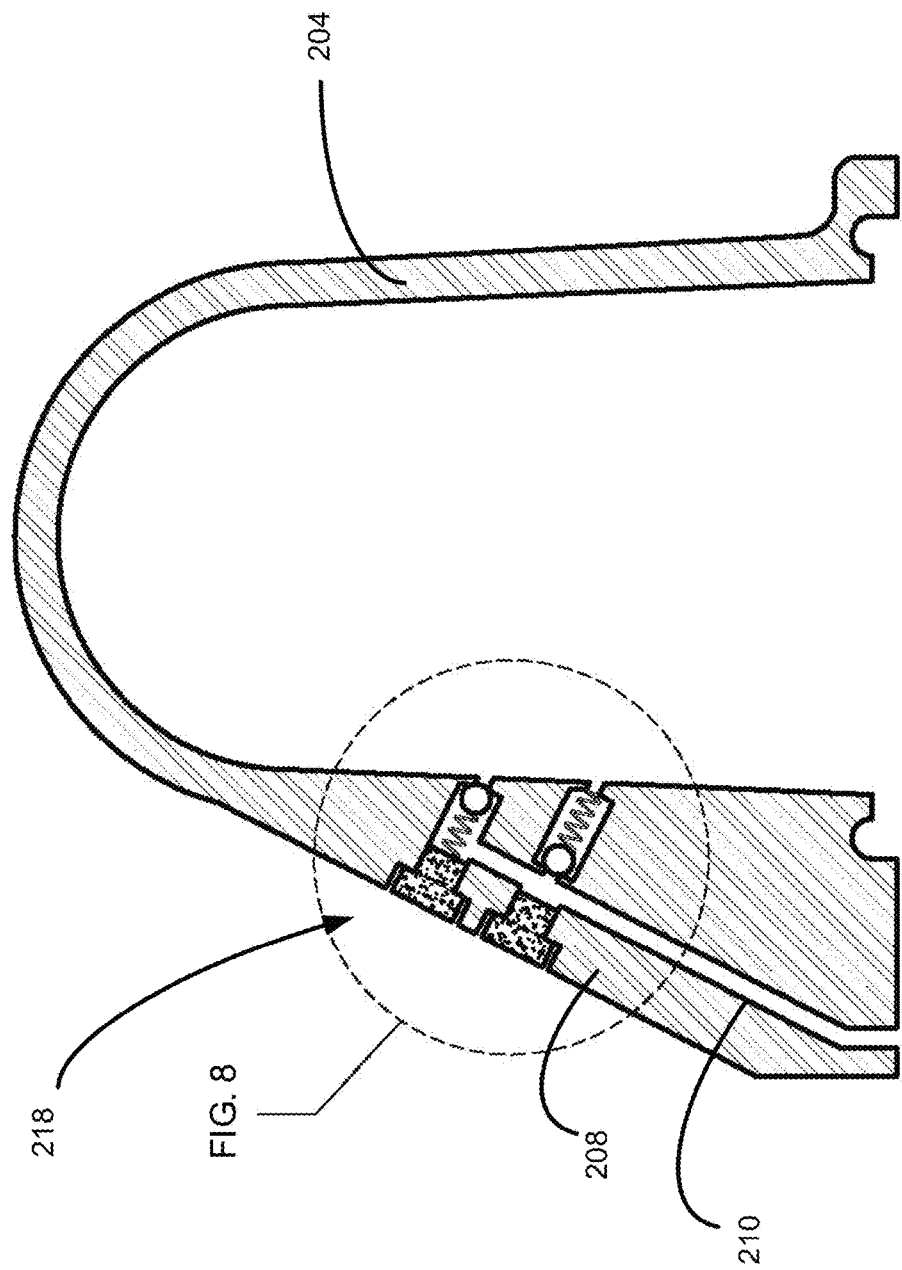
FIG. 7 shows a side, cut-away view of an exemplary pressure relief assembly in accordance with a first preferred embodiment of the present invention.
Figure 8:
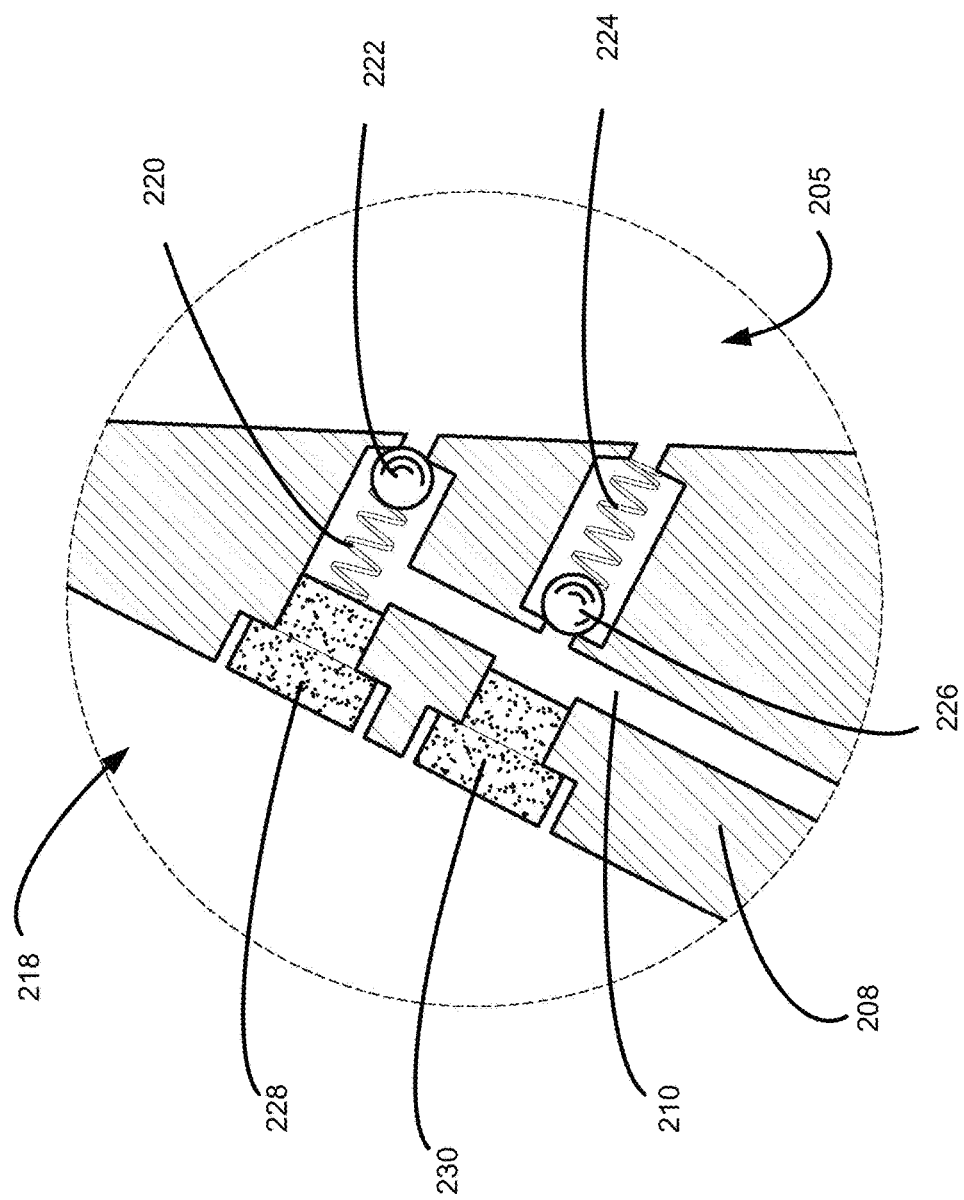
FIG. 8 shows an enlarged portion of the pressure relief assembly as indicated in FIG. 7.

Referring to FIGS. 4 and 5, the expansion cap vent enclosure 208 preferably may enclose at least one expansion cap vent channel 210. The vent channel 210 may preferably extend from the vent plug passage 211 and through to the lower surface of the expansion cap vent enclosure 208. The gearbox casting vent enclosure 212 preferably includes at least one gearbox casting vent channel 214 which extends the length of the gearbox casting vent enclosure 212 and which is open to the atmosphere via a casting vent outlet 216.

As shown, when the expansion cap 204 is connected to the gearbox 202, the expansion cap vent enclosure 208 and the gearbox casting vent enclosure 212 are preferably aligned and mated so that the expansion cap vent channel 210 and gearbox casting vent channel 214 form a single continuous air channel which allows controlled venting from within the expansion cap 204 to the atmosphere.

As further shown in FIG. 5, the expansion cap vent channel 210 preferably interfaces with the vent plug passage 211 which preferably contains a vent cap plug 206 or another valve assembly so that the vent cap plug 206 (or other valve assembly) may control the flow of air out from the expansion cap cavity 205 and into the expansion cap vent channel 210. In this way, the expansion cap assembly and gearbox design of the present invention preferably allows the gearbox 202 to controllably breathe to the atmosphere. More specifically, the air channels 210, 214 of the present invention, which are built into the expansion cap vent enclosure 208 and the gearbox casting vent enclosure 212 respectively, preferably allow for controlled venting while limiting contaminants into the expansion cap 204 and/or gearbox cavity 203.

In accordance with further preferred embodiments of the present invention, the expansion cap 204 may be installed on the gearbox 202 after the gearbox 202 has been assembled and filled with oil. According to a first preferred embodiment, the expansion cap 204 may first be shipped with a small retaining plug 207 (shown in FIG. 6) which may be installed in the inner most threaded section of the vent plug passage 211. Preferably, the retaining plug 207 may form an air-tight seal within the vent plug passage 211 and may thus prevent oil from exiting the gearbox during shipping. Thereafter, when the gearbox assembly 200 of the present invention is installed in the field, the small retaining plug 207 may preferably be removed from the vent plug passage 211 and replaced by a functional vent cap plug 206 (or other valve assembly) which may be installed on the outer most part of the threaded portion of the vent plug passage 211.

With reference now to FIGS. 7-11, alternative preferred pressure controlling caps and assemblies for use with the present invention shall now be discussed. With first reference to FIGS. 7-8, a first alternative pressure relief assembly 218 may preferably include a first bolt/plug 228 which includes a first spring 220 and ball/disc 222 which are arranged to control and react to positive internal pressure within the expansion cap cavity 205. As shown, when sufficient positive pressure within the expansion cap cavity 205 pushes on the ball 222 and compresses the spring 220, the internal pressure may be released into the expansion cap vent channel 210. Conversely, in the case of sufficient negative pressure, a secondary bolt/plug 230 may include a second ball/disc 226 which may compress a second spring 224 and thus allow negative pressures within the expansion cap cavity 205 to equalize or be reduced.

Figure 9:
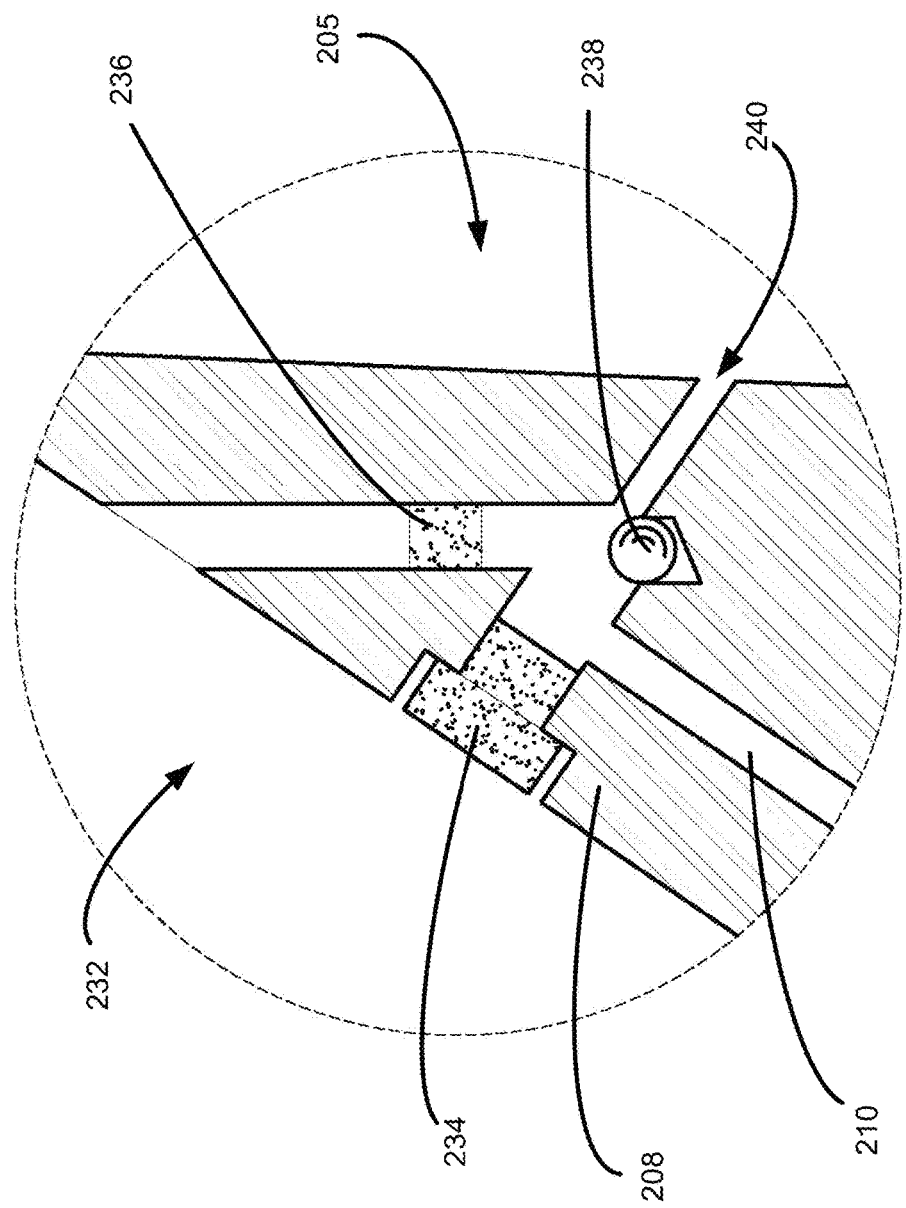
FIG. 9 shows a side, cut-away view of an exemplary gravity plug assembly in accordance with a further preferred embodiment of the present invention.

With reference now to FIG. 9, a second alternative preferred pressure controlling assembly 232 for use as part of the present invention shall now be discussed. As shown, the second alternative preferred pressure controlling assembly 232 preferably includes a bolt/plug 234, a second plug 236, and a ball/disc 238. The assembly 232 preferably functions to limit and close one or more vent pathways 240 when the gearbox is tipped or tilted beyond a given degree. For example, when a gearbox 200 is tilted, the ball/disk 238 may preferably move and settle into the vent pathway 240 or expansion cap vent channel 210 thus preventing contaminates from entering the vent pathway 240 or oil leaving expansion cap vent channel 210.

Figure 10:
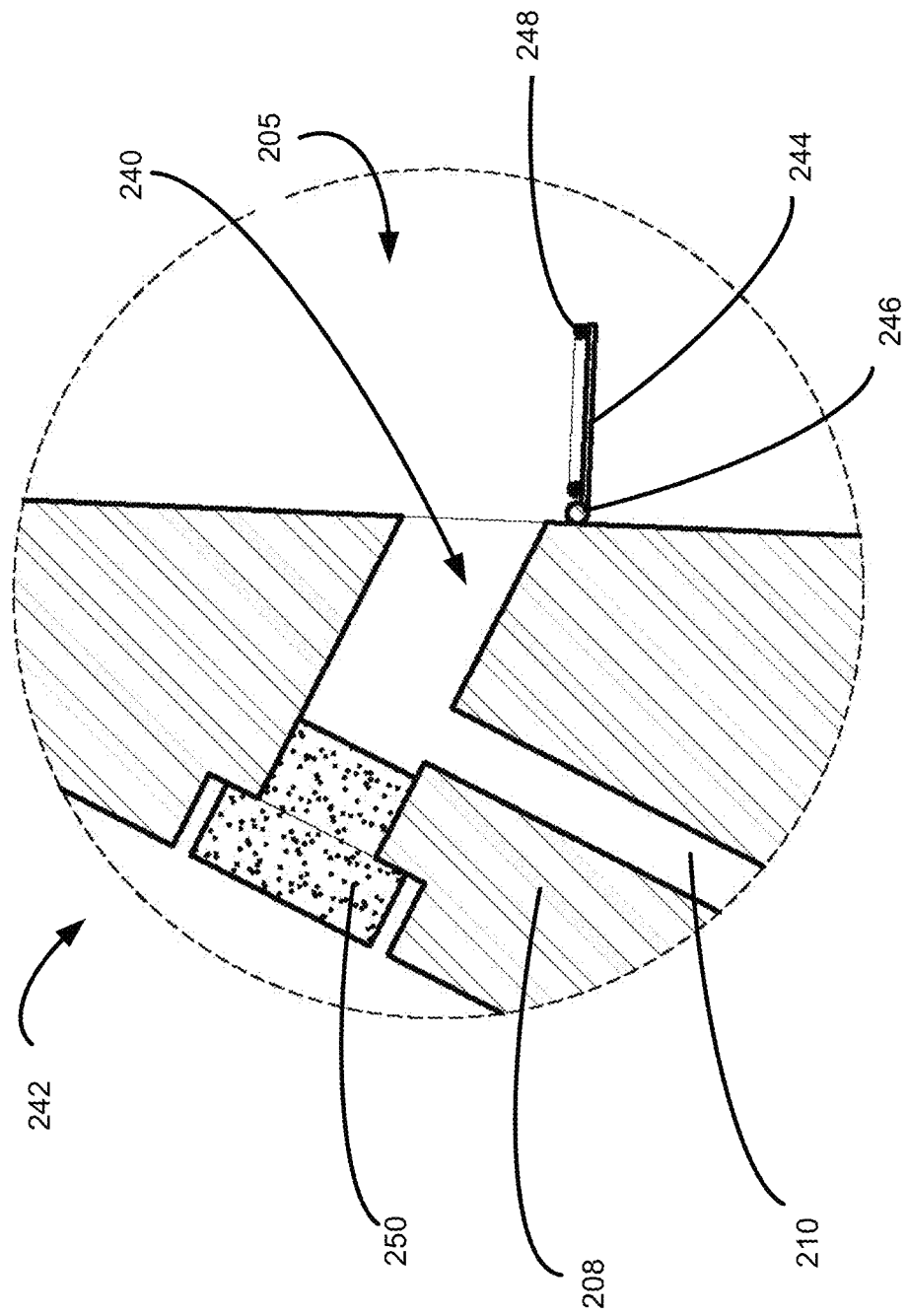
FIG. 10 shows a side, cut-away view of an exemplary flapper valve assembly in accordance with a preferred embodiment of the present invention.
Figure 11:
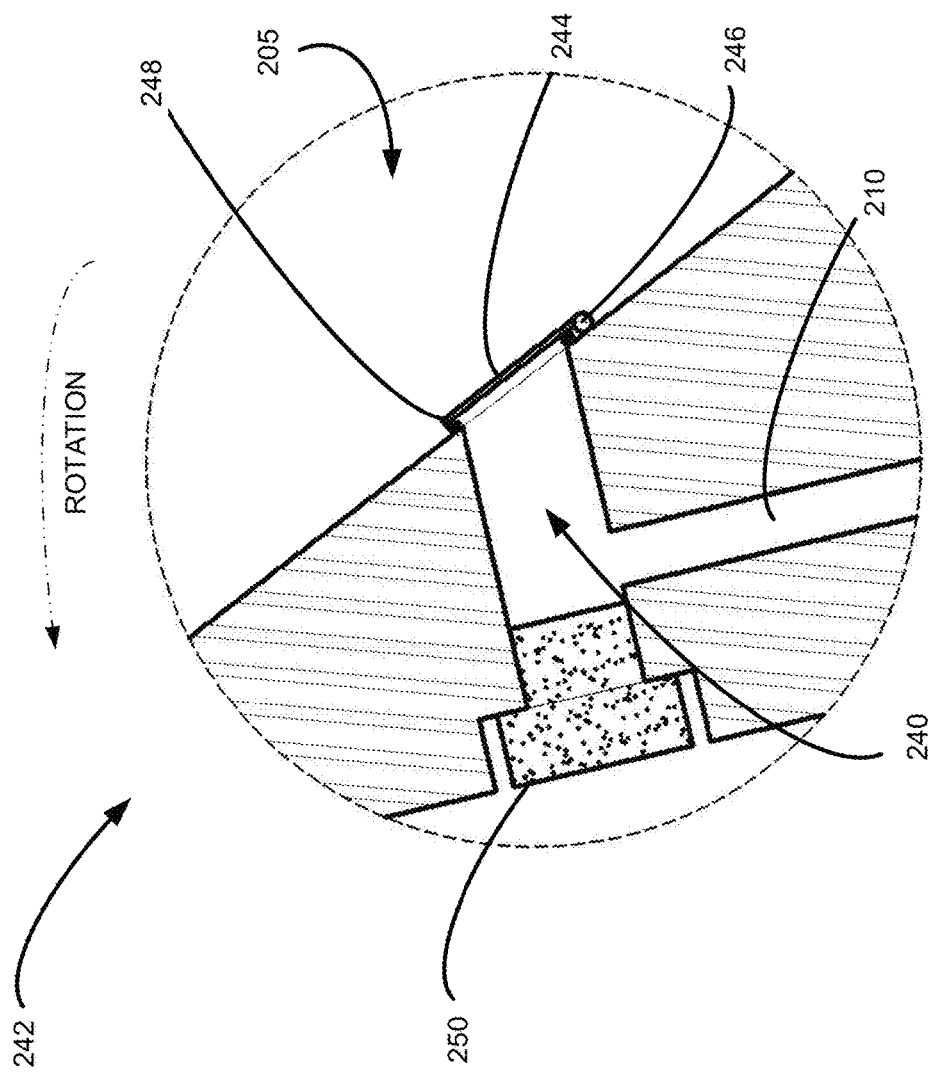
FIG. 11 shows a side, cut-away view of the exemplary flapper valve assembly shown in FIG. 10 with the flapper assembly in a closed/sealed position.

With reference now to FIGS. 10 and 11, a third alternative preferred assembly 242 for use as part of the present invention shall now be discussed. As shown, the third alternative assembly 242 preferably may include a bolt/plug 250 and a hinged plate 244 for sealing the vent pathway 240 when the gearbox is tipped or tilted beyond a given degree. As shown, the hinged plate 244 may include a hinge 246 and a seal 248. In operation, the hinged plate 244 is preferably weighted and balanced so that, when the gearbox 200 is upright, the hinged plate 244 may sit open allowing access to the vent pathway 240 and the expansion cap vent channel 210. Conversely, as shown in FIG. 11, when the gearbox 200 is tilted, the plate 244 is preferably weighted to move to a closed position with the seal 248 blocking oil from leaving the central cavity 205.

The present invention as described herein will preferably allow a wheel gearbox to vent freely to the atmosphere without contaminating the crops that are being irrigated, and will help prevent other leak issues associated with the wheel gearbox. The present invention may further be used on a variety of gearbox arrangements. For example, the present invention could be used on a center-drive gearbox or the like. The scope of the present invention should be determined not by the embodiments illustrated, but by the appended claims and their legal equivalents.

What is claimed is:

1. A gearbox assembly, wherein the gearbox assembly comprises:
   a gearbox, wherein the gearbox comprises a gearbox vent enclosure; wherein the gearbox vent enclosure comprises a gearbox vent channel and a gearbox vent outlet;
   an expansion cap, wherein the expansion cap comprises an expansion cap cavity which encloses a first volume of air; wherein the expansion cap is attached to a top surface of the gearbox; wherein the expansion cap comprises an expansion cap vent enclosure; wherein the expansion cap vent enclosure comprises a first vent plug passage and an expansion cap vent channel; wherein the first vent plug passage is in gaseous communication with the expansion cap cavity; wherein the first vent plug passage is further in gaseous communication with the expansion cap vent channel;
   a first vent plug; wherein the first vent plug is removably inserted into the first vent plug passage; wherein the expansion cap vent channel is further in gaseous communication with the gearbox vent channel; wherein the gearbox vent channel is in gaseous communication with an atmosphere external to the gearbox assembly via the gearbox vent outlet;
   a central gasket, wherein the central gasket is secured between the expansion cap and the gearbox;
   wherein the expansion cap vent channel extends from the first vent plug passage and through the expansion cap vent enclosure; wherein the expansion cap vent channel is located to align with and mate with the gearbox vent channel.

2. The assembly of claim 1, wherein the gearbox vent channel extends through the gearbox vent enclosure to the gearbox vent outlet.

3. The assembly of claim 2, wherein the expansion cap vent enclosure and the gearbox vent enclosure are aligned and mated so that the expansion cap vent channel and the gearbox vent channel form a single continuous air channel which allows controlled venting from within the expansion cap to the atmosphere.

4. The assembly of claim 3, wherein the assembly further comprises a first spherical body within the first vent plug passage; wherein the first spherical body is configured to move between a first open position and a second closed position; wherein the first spherical body is configured to move between the first open position and the second closed position in response to changes in the orientation of the assembly.

5. The assembly of claim 4, wherein the first spherical body allows air to pass through the first vent plug passage and into the expansion cap vent channel when the first spherical body is in the first open position; wherein the first spherical body blocks air from passing through the first vent plug passage when the first spherical body is in the second closed position.

6. The assembly of claim 3, wherein the assembly further comprises an internal flap located within the expansion cap vent enclosure; wherein the internal flap comprises a hinge, a sealing surface and a weighted edge.

7. The assembly of claim 6, wherein the internal flap is configured to move between a first open position and a second closed position; wherein the internal flap moves between the first open position and the second closed position in response to changes in the orientation of the assembly.

8. The assembly of claim 7, wherein the internal flap allows air to pass through the first vent plug passage and into the expansion cap vent channel when the internal flap is in the first open position; wherein the internal flap is configured to block air from passing through the first vent plug passage when the internal flap is in the second closed position.

9. The assembly of claim 3, wherein the assembly further comprises a first spring element and a first spherical body; wherein the first spring element and the first spherical body are located within the first vent plug passage.

10. The assembly of claim 9, wherein the first spring element contacts the first vent plug on a first side and the first spherical body on a second side; wherein the first spring element is compressible in response to air pressure within the expansion cap cavity exceeding a first air pressure level; wherein the first spherical body is configured to move in response to the compression of the first spring element to allow air to flow from within the expansion cap cavity to the expansion cap vent channel.

11. The assembly of claim 10, wherein the expansion cap vent enclosure further comprises a second vent plug passage; wherein the second vent plug passage is in gaseous communication with the expansion cap cavity; wherein the second vent plug passage is further in gaseous communication with the expansion cap vent channel.

12. The assembly of claim 11, wherein the assembly further comprises a second vent plug which is removably inserted into the second vent plug passage.

13. The assembly of claim 12, wherein the assembly further comprises a second spring element and a second spherical body; wherein the second spring element and the second spherical body are located within the second vent plug passage.

14. The assembly of claim 13, wherein the second spring element contacts the second vent plug on a first side and the second spherical body on a second side; wherein the second spring element is compressible in response to negative air pressure exceeding a second air pressure level.

15. The assembly of claim 14, wherein the second spherical body is configured to move in response to the compression of the second spring element to allow air to flow into the expansion cap cavity from the expansion cap vent channel.

* * * * *